(12) United States Patent
Agarwal et al.

(10) Patent No.: US 9,602,964 B1
(45) Date of Patent: *Mar. 21, 2017

(54) CURRENT LOCATION-BASED COMMUNICATION WITH MOBILE DEVICES

(71) Applicant: International Business Machines Corporation, Armonk, NY (US)

(72) Inventors: Kanak B. Agarwal, Austin, TX (US); Patrick J. Bohrer, Austin, TX (US); Ahmed Gheith, Austin, TX (US); Michael D. Kistler, Austin, TX (US); Ramakrishnan Rajamony, Austin, TX (US); Brian L. White Eagle, Austin, TX (US); James Xenidis, Cedar Park, TX (US)

(73) Assignee: INTERNATIONAL BUSINESS MACHINES CORPORATION, Armonk ( * ) Notice: Subject to any disclaimer, the term of this patent is extended or adjusted under 35 U.S.C. 154(b) by 0 days.

This patent is subject to a terminal disclaimer.

(21) Appl. No.: 14/846,922

(22) Filed: Sep. 7, 2015

(51) Int. Cl.
*H04W 4/02* (2009.01)
*H04W 64/00* (2009.01)
*H04W 4/16* (2009.01)

(52) U.S. Cl.
CPC .............. *H04W 4/02* (2013.01); *H04W 4/16* (2013.01); *H04W 64/00* (2013.01)

(58) Field of Classification Search
CPC ......... H04W 4/02; H04W 64/00; H04W 4/16; H04W 4/023; H04W 4/025; H04W 40/20; H04W 76/002; H04W 48/04; H04W 4/028; H04W 8/205; H04L 67/18; H04L 41/5054; H04M 1/72572; H04M 3/38; H04M 3/562; H04M 3/565; G01S 5/0027
USPC ................... 455/456.1, 456.3, 404.2, 414.2; 705/14.58; 342/386
See application file for complete search history.

(56) References Cited

U.S. PATENT DOCUMENTS

| 2007/0099609 | A1* | 5/2007 | Cai ..................... H04L 41/5054 455/428 |
| 2009/0213844 | A1* | 8/2009 | Hughston ........... H04M 3/4872 370/352 |
| 2010/0211446 | A1* | 8/2010 | Ray ........................ G06Q 30/02 705/14.19 |

(Continued)

OTHER PUBLICATIONS

Appendix P.

*Primary Examiner* — Nizar Sivji
(74) *Attorney, Agent, or Firm* — Garg Law Firm, PLLC.; Rakesh Garg; William Stock (57) ABSTRACT

For current location-based telecommunication, an instruction is sent from a caller communication device to initiate a telecommunication with a set of destination communication devices. The instruction includes identifying information for a reference device but does not include any identifying information for the set of destination communication devices. Telecommunication data is received at the caller communication device from a destination communication device in the set of destination communication devices, where a server has established a communication channel between the caller communication device and the destination communication device based on a geolocation proximity of the destination communication devices relative to the reference device.

20 Claims, 6 Drawing Sheets

(56) References Cited

U.S. PATENT DOCUMENTS

| | | | | |
|---|---|---|---|---|
| 2010/0279666 A1* | 11/2010 | Small | ............... | H04M 1/576 455/414.1 |
| 2011/0249658 A1* | 10/2011 | Wohlert | ............... | H04W 4/04 370/338 |
| 2012/0317205 A1* | 12/2012 | Lahiani | ............... | G06Q 10/10 709/206 |
| 2013/0078943 A1* | 3/2013 | Biage | ............... | H04M 3/5116 455/404.2 |
| 2013/0117122 A1* | 5/2013 | Cooper | ............... | G06Q 30/0261 705/14.58 |
| 2013/0218681 A1* | 8/2013 | Haney | ............... | H04W 12/08 705/14.58 |

* cited by examiner

CURRENT LOCATION-BASED COMMUNICATION WITH MOBILE DEVICES

TECHNICAL FIELD

The present invention relates generally to a method, system, and computer program product for telecommunications with mobile devices. More particularly, the present invention relates to a method, system, and computer program product for current location-based communication with mobile devices.

BACKGROUND

Communication devices, such as mobile devices, are usable for telecommunications, and proliferate all aspects of daily life. Users with mobile devices frequently travel to a variety of places for a variety of purposes. It is conceivable that regardless of what or where a place might be, if there is a human user in that place, it is very likely that the user has a mobile device on the user's person or otherwise available to the user with which to establish a telecommunications call (hereinafter, "call").

A call is any suitable method of telecommunication, including but not limited to audio telephonic communications, video telecommunications, textual messaging, taptically or haptically telecommunicating information, and generally telecommunication of data in these and other forms. Any type of communication device, including but not limited to landline telephone equipment and mobile devices, can be used for a call. A mobile device is capable of relocating from one location to another as a user associated with the mobile device moves from one location to another. As some non-limiting examples, the mobile device can take the form of a cellular phone, a smartphone device, a tablet computer, a portable computing platform, a wearable device, and the like.

A typical call begins with a calling user (hereinafter, "caller") dialing the number associated with a mobile device associated with a called user (hereinafter, "callee"). A communication device associated with a caller is also referred to herein as a caller communication device. A communication device associated with a callee is also referred to herein as a destination communication device. The service provider connects the call between the caller's telecommunication device and the callee's mobile device. In some cases, the caller selects a callee's name, such as from a phonebook or a similar contacts management application, and the caller's device calls the number stored relative to the callee's name in the phonebook.

In some cases, a caller may not know the callee or a callee's number. A caller can use a directory service, whereby the caller identifies the intended callee by name, address, or both, and the directory service provides the callee's number to the caller, connects the call between the caller and the callee, or both.

The illustrative embodiments recognize that for the directory service to work using only the address, the callee's number has to be permanently associated with that address, even if the number is assigned to a mobile device. In other words, if a callee has to be reached only by knowing the callee's address, the callee's number must be unchangeably associated with the address, even if the device associated with the number is mobile.

The illustrative embodiments recognize that presently, there is no available method by which a caller could call any callee who may be present at a given geographic location (geolocation) at a given time. In other words, if a caller were interested in calling anyone who may be present at or around a specified geographical location, during a given period, the caller will be able to call that location only if either a number is permanently associated with that location and the caller calls that number, or the caller calls a specific known callee whose presence at the location might be a known fact to the caller.

The illustrative embodiments recognize that presently there is no available method by which a caller could call any callee who may be present at a location where the location is determined dynamically by the current location of a mobile device. In other words, if a caller were interested in calling anyone who may be present at or around the current location of another device—a reference device, the caller is presently unable to make this call to a destination communication device without some apriori knowledge of the set of callees or the set of destination communication devices present in the same location as the reference device. A reference device can be any device capable of being geolocated using geolocation sensing technology including but not limited to GPS, multi-lateration or multi-angulation of wireless signals, entity identification using cameras or Radio Frequency Identification (RFID), or any combination thereof. Geolocation sensing technology with wireless signals can include both indoor and outdoor geolocation technology including Wireless Local Area Network (WLAN), Bluetooth, Ultra-wide Band (UWB), Infrared (IR), RFID or any other sensor network. Specifically, the reference device can be a mobile device, such as a cell phone, comprising a GPS unit, a cellular network unit, and any other common wireless signal unit.

The illustrative embodiments recognize that such a deficiency in the present telecommunications systems are severely limiting in many circumstances. The illustrative embodiments recognize that under certain circumstances, a caller may want to call any callee who satisfies a location-related criterion. A location-related criterion is a criterion or condition, which may specify a location, or from which a location can be deduced, and which must be satisfied by a potential callee.

For example, a caller's daughter might be equipped with a device whose identifier is known to the caller. The device with the daughter is a reference device, whose identifier or identifying information is associated with the reference device. A non-limiting example of such a reference device is a cellular phone or an RFID tag in a credit card. The daughter might be in an unknown place, and the caller might want to call anyone —even an unknown callee—who may be near the caller's daughter at the current time, i.e., the time of the call. In other words, the caller, using a caller communication device, should be able to call a set of destination communication devices, whose identifying information, e.g., phone numbers, are not known to the caller communication device, but such destination communication devices are within a specified distance of the reference device whose identifying information is known to the caller communication device. For example, the location may have a landline whose number is unknown to the caller, or may not have a phone or a number associated therewith. Furthermore, different callees with different destination communication devices may be present at the location at different times. The callee's presence within the specified distance from the reference device is interpreted as the reference device being in geolocation proximity with the reference device.

A service provider's system can resolve the daughter's location by locating the reference device. The criterion or instruction from the caller communication device provides the identifying information of the reference device and a default or other distance for the geolocation proximity of a destination communication device relative to the reference device. Thus, providing the identifying information of the reference device and optionally the distance for geolocation proximity is a location is an example of a current location-related criterion or instruction according to the illustrative embodiments.

As another example, a caller might want to call anyone—even an unknown callee—who may be at the park now, to ask whether they see a child with a red sweater on the swing there. The park may not have a number associated therewith, and different callees may be present at the park at different times. The callee's presence at a location—the park—is an example of a location-related criterion where the park is a location specified in the criterion.

As another example, a caller might want to call anyone—even an unknown callee—who may be near a store, to ask whether the store has a line of patrons outside. The callee's presence at a location—near the store, e.g., within certain distance of the store—is another example of a location-related criterion where the store may be specified but "near" the store may be an unspecified location in the location-related criterion. The "near the store" location may not have a number associated therewith, or even an address associated therewith. Furthermore, the "near the store" may not be a specific location but an area, such as an area defined by a radius or other geographical fence. Additionally, different callees, with different mobile devices, and with different numbers or identifiers, may be present in the area at different times.

As another example, a caller might want to call anyone—even an unknown callee—if certain other types of location-related conditions or criteria are met by the callee, to exchange some information. For example, the caller might be interested in calling someone who is stationary, i.e., not driving, and ask the callee a landmark that is visible from the callee's location. The callee being stationary at the callee's location is another example of a location-related criterion where the callee's location may or may not be specified in the location-related criterion. As in the other examples above, different callees, with different mobile devices, and with different numbers or identifiers, may be present at the callee's location at different times. As another example, the caller might be interested in calling someone who is in a group of ten people or more, with a known person, such as a well known performer whose present location is available. The callee's presence with a group is another example of a location-related criterion where the location of the group is unspecified in the location-related criterion. Again, different callees, with different mobile devices, and with different numbers or identifiers, may be present with the known person at different times.

As another example, the caller might be interested in calling anyone who is situated so as to be able to reach a location within a given amount of time. The callee's presence at one location—from where another location is reachable—is an example of a location-related criterion, where the other location may or may not be specified, as in the above examples. Again, different callees, with different mobile devices, and with different numbers or identifiers, may be within such a distance from the location at different times.

As another example, the caller might be interested in calling more than one callee who is located in an area or location during a given period. Particularly, the caller may want at least n callees to respond, no more than n callees to respond, n or more callees to respond, or some combination thereof. Furthermore, the caller may want one or more responses within a given period. Not only could different callees, with different mobile devices, and with different numbers or identifiers, be present at the location during the period, but also the group of potential callees may change during the period as callees enter and leave the area.

These examples situations are not intended to be limiting. From this disclosure, those of ordinary skill in the art will be able to conceive many other situations where such calls are desirable and the same are contemplated within the scope of the illustrative embodiments.

The illustrative embodiments recognize that presently available methods of calling are severely limited in establishing a call in these and other similar circumstances. Thus, a solution for calling one or more transient callees or callee-associated mobile devices based on the mobile device's location is needed and will be beneficial.

SUMMARY

The illustrative embodiments provide a method, system, and computer program product for current location-based telecommunication with communication devices. An embodiment includes a method for current location-based telecommunication with communication devices. The embodiment sends, from a caller communication device, an instruction to initiate a telecommunication with a set of destination communication devices, where the instruction comprises identifying information for a reference device but does not include any identifying information for the set of destination communication devices. The embodiment receives, at the caller communication device, telecommunication data from a destination communication device in the set of destination communication devices, where a server has established a communication channel between the caller communication device and the destination communication device based on a geolocation proximity of the destination communication devices relative to the reference device.

Another embodiment includes a computer usable program product comprising a computer readable storage device including computer usable code for current location-based telecommunication with communication devices.

Another embodiment includes a data processing system for current location-based telecommunication with communication devices.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The use-cases and the various embodiments are described herein using mobile devices only as non-limiting examples. From this disclosure, those of ordinary skill in the art will be able to adapt an embodiment or a use-case to use any other suitable form of a communication device, and such adaptations are contemplated within the scope of the illustrative embodiments. For example, some use-cases and/or embodiment can be adapted to use a landline phone or a similar communication device.

The illustrative embodiments used to describe the invention generally address and solve the above-described problems and other problems related to calling one or more transient and unknown callees based on the callees' location. The illustrative embodiments provide a method, system, and computer program product for current location-based communication with mobile devices.

Within the scope of the illustrative embodiments, a location call is a call placed by one caller to one or more transient and unknown callees based on the callees' location. From the caller's perspective, the location call is an outbound location call. From a callee's perspective, the location call is an inbound location call.

Within the scope of the illustrative embodiments, a location includes a precisely specified geographical point, a description of a structure or landmark located in a geographical region, a defined and bound geographical area, a geographical point or area that meets a criterion or condition, or some combination thereof.

Within the scope of the illustrative embodiments, a location can be defined based on a condition that has to be satisfied by the potential callee in the present tense at a place where the potential callee is situated at the present time. For example, in the use-case where the location call is made to a person who is present at the park, the park is the location, but the person's presence at the park, now, in the present tense, is a location-related condition that the person has to satisfy for becoming a potential callee.

Many other use-cases are similarly conceivable where the potential callee has to satisfy a condition at the time of the callee's presence at the location (location-related condition) to qualify as a potential callee at the location. For example, a person must be co-located with a lost pet at the time of the location call —a location-related condition—to qualify as a potential callee. As the lost pet moves and the location of the lost pet changes, a potential callee at one location becomes unqualified, and perhaps a new person at the new present location of the pet qualifies as a new potential callee. Generally, a location-related condition has to be satisfied by a potential callee, to at least a specified degree, and relative to the location of the call, to qualify the potential callee as a suitable recipient of the location call, to ascertain the location of the location call, or both.

As an example, an example use-case may be that a family member of a caller may have configured their phone on silent mode, and is therefore unaware that the caller is trying to reach the family member. The caller may wish to make a location call to someone who is near the caller's family member at a present time. The location-related condition performs two functions in such a use-case—(i) establish where the family member is located, thereby establishing the location of the location call; and (ii) qualifies a potential callee who satisfies the location-related condition at that location. In this example use-case, the location-related condition is "the potential callee has to be co-located with the family member at the present time". The location where the potential callee has to be situated to satisfy the location-related condition is the location, or within a specified distance—degree of proximity—of the family member. As an example, the present location of the family member is a location of a the family member's silent but operational mobile device. Thus, the potential callee has to be at the location of the family member, or within a specified distance therefrom.

An embodiment can be implemented as an application to execute on a mobile device. One embodiment enables a caller to place an outbound location call. Another embodiment enables a callee to respond to, accept, or otherwise handle an incoming location call. Another embodiment is configured to facilitate features described with respect to both—outbound location calls and inbound location calls.

An embodiment detects that the caller wishes to initiate a location call. For example, according to one embodiment, a caller selecting an area or a location on a map application triggers the detection that the caller wishes to initiate a location call. For example, the caller may point to, or draw on a map presentation to select an area or a location. A profile configuration of the caller or another selection tool allows the caller to specify the size of the area, such as by selecting a default or specified radius from the pointed-to location. For example, when the caller points to a location on a map, a pre-configured preference selects an area of n feet radius centered at the selected location. As another example, when the user selects an office building, the entire office campus, or a pre-defined area therein, may be selected.

According to another embodiment, a caller inputting a description of an area or a location, such as via a natural language interface, triggers the detection that the caller wishes to initiate a location call. For example, a caller can speak a description into an audio input interface, type a question in a natural language, such as, for example, "who is at the park?" or "call someone at the Smith party," or "can anyone tell me whether the light at the intersection of First street and Avenue K is still out?"

According to another embodiment, a caller selecting or highlighting a description of an area or a location, such as on a calendar application, triggers the detection that the caller wishes to initiate a location call. For example, if the caller selects a meeting on the caller's calendar, a location of the meeting is automatically selected.

According to another embodiment, a caller selecting a mobile device, which may be a cellular phone, a smartphone device, a portable computing platform, a wearable device, a relocatable Bluetooth beacon, a radio-frequency identification (RFID) device, or similar mobile device, triggers the detection that the caller wishes to initiate a location call to the current location of the mobile device. For example, the caller may select the RFID device implanted in his dog's collar to initiate a location call to any callees at or near the same current location as his dog.

An embodiment further presents the caller a user interface from where the caller can configure a number of criteria or conditions for the outbound location call. For example, according to one embodiment, the caller can specify when the potential callees should be present at the location. As another example, according to another embodiment, the caller can specify how many potential callees should be present at the location. According to another embodiment, the caller can specify how many potential callees should respond to the location call. According to another embodiment, the caller can specify a timeout period within which a potential callee should respond; otherwise the location call should be terminated. According to another embodiment, the caller can specify the request the caller has for a callee who answers the location call, e.g., a text message that should be presented to the callee who accepts the location call.

An embodiment transmits the location information, a criterion, or both, to a service provider whose network will be utilized for the call. A server application on the service provider's network receives the location, the criterion, or a combination thereof. The server application identifies one or more mobile devices that are, were, will likely be, or will be, situated at the specified location at the specified time.

As some non-limiting examples, a mobile device's geographical location can be established by receiving from the mobile device its Global Positioning system (GPS) coordinates and a travel trajectory, by triangulating the mobile device's position and trajectory from the cellular or wireless network base stations, or by detecting proximity to a wireless networking beacon or access point which is itself in a known location.

The server application prepares a callee list. The callee list includes the identified mobile devices and their associated identifiers or numbers. Each callee associated with an identified mobile device is a potential callee.

In one embodiment, the server application provides the callee list to the application executing on the caller's device. In such an embodiment, an identity of a potential callee, an identifier or number of a potential callee's mobile device, a normalized form of the identity or identifier, or some combination thereof, are revealed to the caller. Even though the potential callees are unknown to the caller, the caller is able to select one or more potential callees, reject one or more callees, or both, based on some caller-determined criteria.

In another embodiment, the server application does not provide the callee list to the application executing on the caller's device. In such an embodiment, an identity of a potential callee, an identifier or number of a potential callee's mobile device, or some combination thereof, are not revealed to the caller. The caller is not able to select one or more potential callees, reject one or more callees, or both, based on some caller-determined criteria.

Note that the selection of some potential callees from a callee list need not be an overt action on the part of the caller. In one embodiment, configuration information used by the embodiment can automatically select or reject a potential callee from a callee list when the callee list is available from the service provider.

An embodiment creates an instruction to initiate the location call. For example, one embodiment passes, as instructions to the server application, the selected callees if a selection was made by the caller from the callee list. As another example, another embodiment passes, as instructions to the server application, any data, such as a text message, that the caller has configured to provide to a callee who accepts the location call.

Either to a caller-selected list of potential callees when the caller selects some potential callees, or to all potential callees in the callee list created by the server application, the server application initiates the location call using the instructions. Optionally, if an embodiment has provided any data to be transmitted to a callee, the server application passes such data to each callee mobile device with which the location call is initiated.

An embodiment allows inbound location call configuration for a callee. A user who could be a potential callee for a future location call can configure the embodiment with one or more preferences for the handling of such future location call. For example, a user can configure the embodiment with a black zone. A black zone is a location or area where the user does not want to participate in one or more location calls.

The user can further configure specific properties of the location calls in which the user does not want to participate while the user's mobile device is located in the black zone. A user can also configure a time period when the user does not participate in location calls while in the black zone. A user can also configure a time period, i.e., a Do Not Disturb (DND) period, when the user does not participate in location calls regardless of where the user is located. A user can also configure a whitelist (or a blacklist) of potential caller's, from any of whom a location call is acceptable (not acceptable).

An embodiment enables a potential callee to configure a combination of these and other similar configuration parameters. These examples of callee configurations are not intended to be limiting. From this disclosure, those of ordinary skill in the art will be able to conceive many other configuration parameters that can be configured in a similar manner, and the same are contemplated within the scope of the illustrative embodiments.

An embodiment further manages the mobile device associated with a potential callee, such as to manage the callee's privacy-related preferences. For example, a callee might want to not participate in a location call not only by rejecting a location call but also by configuring the mobile device in such a way that the mobile device will not be included in a callee list for a specified location. For example, one embodiment hides or otherwise prevents the mobile device's location to become known to the server application. Thus, when the server application does not have the location information of a mobile device, the server application cannot include the mobile device in a callee list. As another example, another embodiment masquerades the mobile device's location, such as by manipulating the device's location such that the device appears to be at a location other than the device's actual location.

An embodiment can manage the mobile device on which the embodiment is implemented such that the mobile device's behavior can be modified in a variety of ways. For example, an embodiment can modify the mobile device's behavior differently for different incoming location calls, based on a present location of the device when an location call is received, based on time when an location call is received, based on a source or caller of a location call (when the caller is identified to the callee), or some combination of these and other factors.

An embodiment further transmits one or more callee preferences described herein to a service provider. Such a transmission allows or prevents a server application from including the user's mobile device in a list of potential callees.

When an inbound location call is received at the mobile device, an embodiment allows a variety of call handling options to the callee. For example, the embodiment allows the callee to accept or answer the call, decline or reject the call, allows the call to fail, or manipulate a configuration parameter of the device such that the device no longer complies with a requirement of the location call.

If the callee accepts a location call, an embodiment further responds to the caller with any data that may be requested from the callee. For example, the embodiment can capture and transmit an image of a surrounding where the mobile device is present. As another example, an embodiment can transmit a message or a disclaimer to the caller before the callee and the caller communicate in the call. An embodiment can make these and other similarly purposed data transmissions at the beginning of the location call, during the location call, prior to a termination of the location call, or even after a location call has terminated.

For example, using an embodiment, a caller may wish to perform a poll by asking a group of potential callees whether they prefer corn chips or potato chips. The caller may leave the poll open for five minutes after which the poll closes and the location call ends. The embodiment then summarizes the results of the poll and transmits to some or all callees. For example, the result data may be transmitted to only those callees who participated in the poll, or to all potential callees in the group. Such a transmission of the result data would be a transmission done after the location call terminates. Those of ordinary skill in the art will be able to conceive may other circumstances of data transmissions that occur at the beginning of the location call, during the location call, prior to a termination of the location call, or even after a location call has terminated, and the same are contemplated within the scope of the illustrative embodiments.

A method of an embodiment described herein, when implemented to execute on a device or data processing system, comprises substantial advancement of the functionality of that device or data processing system in calling a mobile device based on the device's location. For example, prior-art requires that a caller be able to identify a callee either by an identity of the callee or by a fixed association of a telecommunication identifier, e.g., a phone number, with a location. An embodiment enables a caller to make a location call without knowing the identity of a callee at a location, without the location being associated with any particular telecommunication identifier, or both. An embodiment further enables a caller to make a location call to a location known to the caller only as the current location of a particular mobile device. Operating in a manner described herein, an embodiment performs current location-based communication with mobile devices. Such manner of operating a telecommunication system is unavailable in presently available devices or data processing systems. Thus, a substantial advancement of such devices or data processing systems by executing a method of an embodiment facilitates calls to a transient and dynamic set of callees based on a location of the set of callees. A set of callees or a set of devices is a collection of one or more callees or devices, respectively, unless expressly described differently where used.

The illustrative embodiments are described with respect to certain applications, circumstances, locations, areas, configurations and parameters, time periods, transmissions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
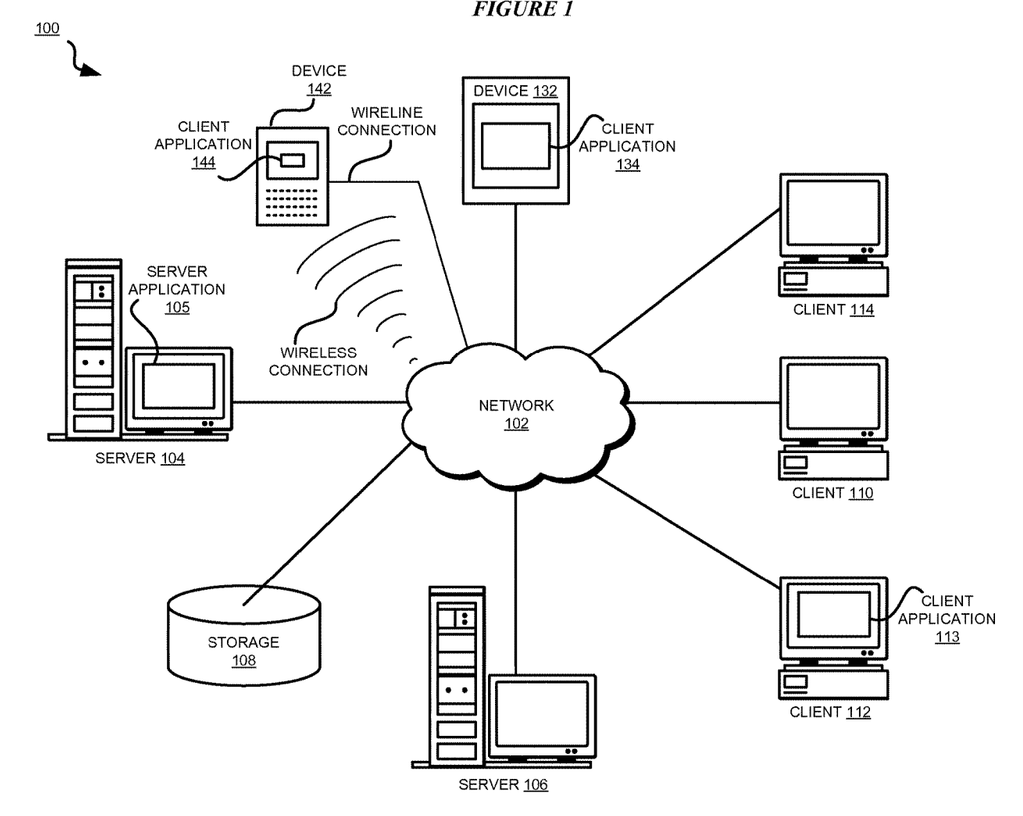
FIG. 1 depicts a block diagram of a network of data processing systems in which illustrative embodiments may be implemented.
Figure 2:
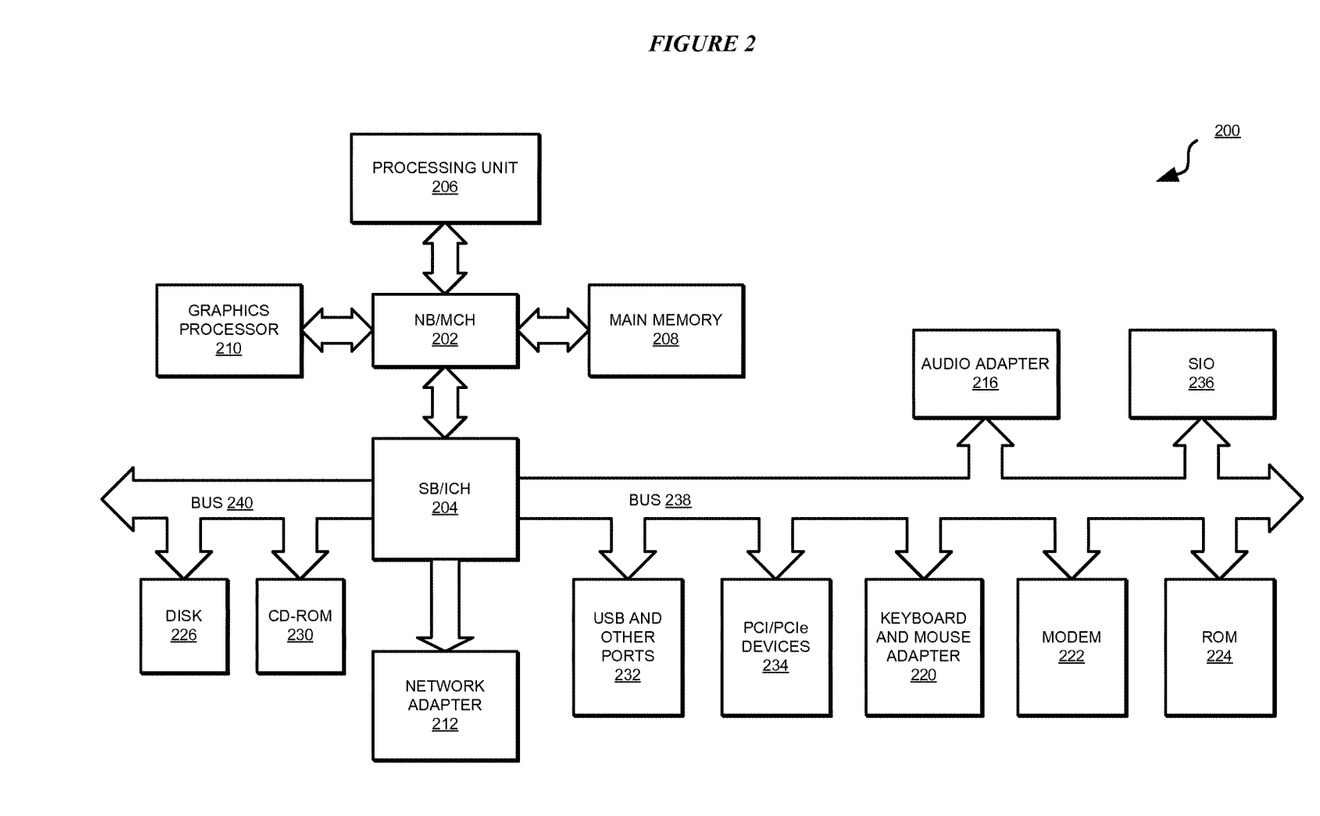
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wired communication links, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Only as an example, device 132 can be a mobile device according to an embodiment, e.g., a tablet computer. Device 142 can be another example of a mobile device, such as a smartphone using a wireless connection to network 102, or an example of a landline communication device—such as a landline telephone equipment or a wired computer with telephony capabilities, using a wireline connection to network 102, as shown. Client 112 is an example of a telecommunication device, including but not limited to a mobile device. Client applications 113, 134, and 144 each implements an embodiment described herein. As a non-limiting example, client application 134 may implement certain callee oriented features of one or more embodiments described herein. As another non-limiting example, client application 144 may implement certain caller oriented features and certain callee oriented features of one or more embodiments described herein. As another non-limiting example, client application 113 may implement certain caller oriented features of one or more embodiments described herein. Generally, a client application can implement any combination of caller oriented features and callee oriented features without limitation. Server application 105 is an application that executes on the server-side of a service provider's network in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 and 142 in FIG. 1 in which computer usable program code or instructions implementing the processes of the illustrative embodiments may be located. Data processing system 200 is described as a computer only as an example, without being limited thereto. Implementations in the form of other devices, such as device 132 and 142 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro—SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android' (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as server application 105 in FIG. 1 and client applications 113, 134, and 144 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
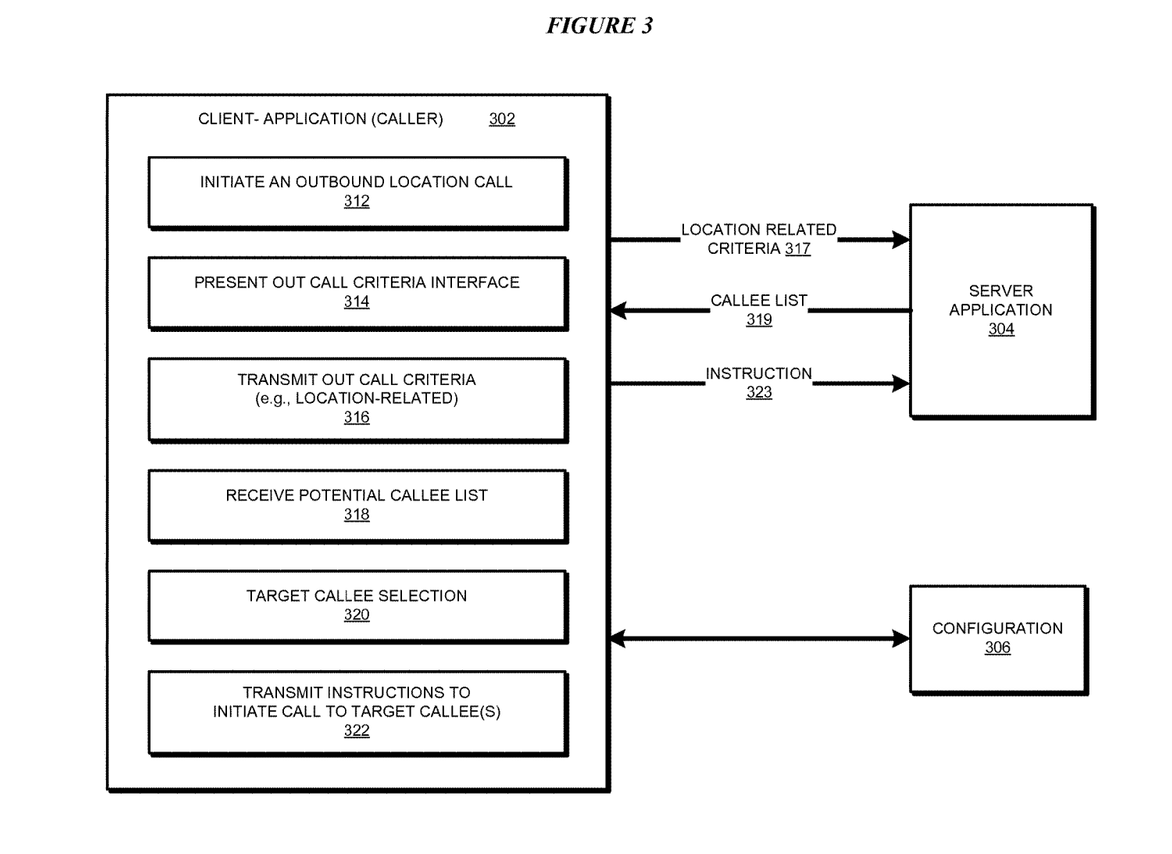
FIG. 3 depicts a block diagram of example caller oriented features for current location-based communication with mobile devices in accordance with an illustrative embodiment.

With reference to FIG. 3, this figure depicts a block diagram of example caller oriented features for current location-based communication with mobile devices in accordance with an illustrative embodiment. Application 302 is an example of any of client applications 134, 144, or 113 in FIG. 1. Server application 304 is an example of server application 105 in FIG. 1.

Component 312 detects that a caller is initiating a location call. For example, component 312 detects that a map application has been opened, a meeting notice is presented, or a location is input in natural language, on the device where application 302 is executing.

Component 314 presents an outbound call criteria selection interface. Any parameters of the outbound location call can be specified using the interface presented by component 314. In some cases, component 314 saves a criterion that has been input by the caller on the interface as a preference in configuration 306. In some cases, component 314 presents as a pre-configured criterion, a preference that has been previously saved in configuration 306.

Component 316 transmits the one or more outbound location call criteria (317) to server application 304. Optionally, as described elsewhere in this disclosure, server application 304 may send callee list 319 to application 302.

A location-related criterion either specifies a location, or from which a location can be deduced, and which must be satisfied by a potential callee. In one embodiment, the potential callee satisfies location-related criteria (317) by being situated at the location that is specified in or deduced from a location-related criterion 317. For example, if a location-related criterion 317 requires a potential callee to be within two hundred feet of a location of a credit card transaction made by the caller's family member, the potential callee satisfies such a location-related criterion 317 by being situated within two hundred feet of such a location.

In another embodiment, a location-related criterion 317 includes, or additionally, an condition related to an individual aspect or characteristic of the potential callee that the potential callee has to satisfy. For example, a potential callee has to be stationary near the traffic light at the time of the location call, to provide the caller the status of the traffic light, as described in another example use-case in this disclosure. As another example, in the use-case involving the credit card transaction, the location-related criterion 317 or another criterion in location-related criteria 317 can require that the potential callee not only be situated within two hundred feet of the location of the transaction but also be able to converse in a particular language with the family member of the caller.

When callee list 319 is available to application 302, component 318 receives callee list 319 from server application 304. In some cases, component 318 may prepare and send a request to server application 304 for callee list 319.

Component 320 enables the caller to select one or more potential callees from callee list 319. In some cases, component 320 automatically selects one or more potential callees, automatically rejects one or more potential callees, or both, based on a preference saved in configuration 306. For example, given a callee list, one embodiment can identify whether anyone on the callee list is also in a contacts list accessible to the caller's device. From this disclosure, those of ordinary skill in the art will realize that configuration 306 may be dynamically computed by application 302 based on information from the Internet such as a social media network.

Component 322 prepares an instruction to initiate the outbound location call. For example, component 322 collects from the caller any messages that are to be delivered to a callee, any limitations on the location call such as a timeout or a number of responding callees, and transmits them as one or more instruction 323 to server application 304.

Figure 4:
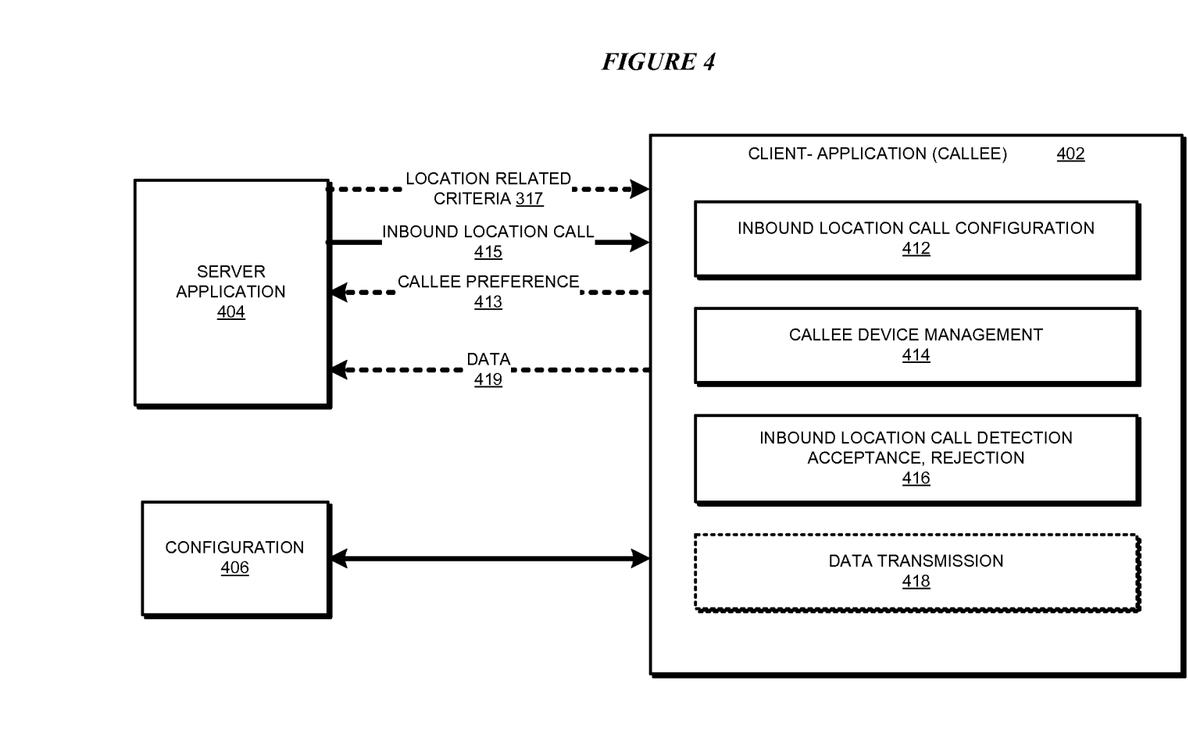
FIG. 4 depicts a block diagram of example callee oriented features for current location-based communication with mobile devices in accordance with an illustrative embodiment.

With reference to FIG. 4, this figure depicts a block diagram of example callee oriented features for current location-based communication with mobile devices in accordance with an illustrative embodiment. Application 402 is an example of any of client applications 134, 144, or 113 in FIG. 1. Application 402 can also be implemented together with the features of application 302 in FIG. 3, in the form of a single application. Server application 404 is an example of server application 304 in FIG. 3.

Component 412 allows a potential callee to configure application 402, the mobile device where application 402 is executing, or both, how the callee would like to handle an inbound location call. A configuration preference provided by the callee is saved in configuration 406. Component 412 may also present to the callee a parameter from configuration 406 as a default configuration or a previously saved preference of the callee. Component 412 may also alter a callee preference based on a time, a location of the callee's device, or a combination thereof, and update configuration 406 accordingly. Optionally, component 412 may send (413) one or more preferences to server application 404. From this disclosure, those of ordinary skill in the art will realize that configuration 406 may be dynamically computed by application 402 based on information from the Internet such as a social media network.

When a location-related criterion 317, or a portion thereof, includes an condition that has to be evaluated using information that is unavailable to client application 302 or server application 304 in FIG. 3, that criterion or portion thereof has to be resolved at a potential callee's device, such as at client-application 402. In such cases, server application 404 transmits criterion 317 or a portion thereof to application 402 executing in a potential callee's mobile device. In such cases component 412 evaluates whether the criterion or the portion thereof is satisfied by using information stored in the device, obtaining the information from the potential callee, or some combination thereof.

Similarly, a criterion or a portion thereof in location-related criteria 317 may ask about the potential callee's state, e.g., at rest, moving, driving, sleeping, at the movies, rushed for time, physically able to assist, or able to help in other ways. In some cases, the potential callee's device may have the information that component 412 needs to evaluate the criterion or the portion thereof, and in other cases, component 412 may have to prompt the potential callee to collect such information.

Component 414 configures the mobile device where application 402 is executing. Particularly, component 414 configures the mobile device to observe or enforce a black zone, DND and other periods, location hiding, location obfuscation or masquerading, and other device configurations described herein.

Server application 404 sends inbound location call 415, or an indication thereof, to application 402. For example, inbound location call 415 may result from instruction 323 sent from application 302 in FIG. 3.

Component 416 detects inbound location call 415. Component 416 accepts, rejects, or allows a failure, of call 415 according to callee preferences in configuration 406. Optionally, when data is requested by a caller or server application 404, as described elsewhere in this disclosure, component 418 sends data 418 to server application 404.

Figure 5:
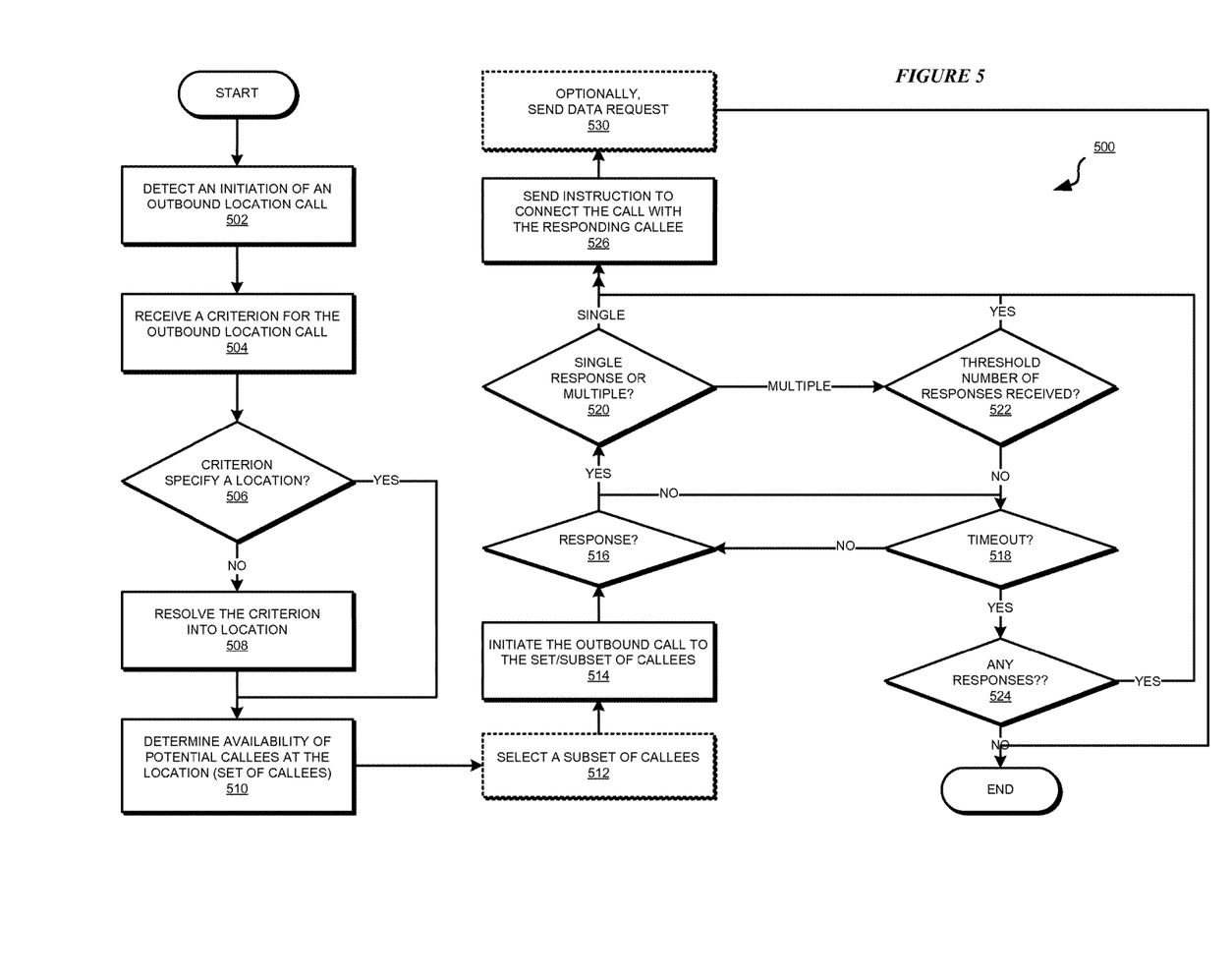
FIG. 5 depicts a flowchart of an example process for current location-based communication with mobile devices in accordance with an illustrative embodiment.

With reference to FIG. 5, this figure depicts a flowchart of an example process for current location-based communication with mobile devices in accordance with an illustrative embodiment. Process 500 can be implemented in application 302 in FIG. 3.

The application detects an initiation of an outbound location call (block 502). The application receives a criterion for the outbound location call (block 504). Any number of criteria can be specified in block 504.

The application determines whether one or more of the criterion specifies a location (block 506). If no criterion specifies a location where the outbound location call is directed ("No" path of block 506), the application resolves a criterion into a location (block 508). For example, if the criterion specifies "the current location of my daughter", the application determines the current location of the caller's daughter in block 508. Block 508 of the application may request a server application, such as server application 304 in FIG. 3, to make this determination. The application proceeds to block 510 thereafter.

If a criterion specifies a location where the outbound location call is directed ("Yes" path of block 506), or if the application resolves the criterion into a location in block 508, the application causes the availability of potential callees at the location to be determined, such as by requesting server application 304 in FIG. 3 to make the determination (block 510). The available potential callees at the location form a set of callees. Optionally, when the set of callees is available or accessible to the application, the application may select a subset of the callees (block 512).

The application initiates the outbound location call to the set of callees or a selected subset thereof, as the case may be (block 514). For example, when block 512 is not executed, the outbound location call is initiated to the set of callees.

The application determines whether a callee has responded, i.e., accepted the location call (block 516). If no callee has accepted the location call while the location call is still active and pending ("No" path of block 516), the application determines whether a timeout period has elapsed (block 518). The timeout may be a default configuration of the application or a server application. The timeout may also be configured as a criterion in block 504.

If the timeout period has not elapsed ("No" path of block 518), the application returns to block 516. If the timeout period has elapsed ("Yes" path of block 518), the application proceeds to block 524.

If a callee has responded, i.e., accepted the location call ("Yes" path of block 516), the application determines whether a criterion in block 504 or a parameter of the outbound location call configuration prefers a single callee to respond or multiple callees to respond (block 520). If multiple callees are preferred ("Multiple" path of block 520), the application determines whether a threshold number of responses have been received (block 522).

If the threshold number of responses have not yet been received ("No" path of block 522), the application proceeds to block 518 to determine whether the timeout period has elapsed. If the timeout period has elapsed ("Yes" path of block 518), the application determines whether any responses, i.e., at least one response, have been received (block 524). If no response has been received ("No" path of block 524), the application ends process 500 thereafter.

If at least one response has been received ("Yes" path of block 524), the application sends an instruction to connect the location call with the responding one or more callees (block 526). If only a single callee was expected to respond ("Single" path of block 520), the application performs block 526 as well. An implementation of block 526 may also connect the caller with the one or more callees as the callees respond. For example, such a connection may be progressively established with responding callees as the callees accept the location call in the form of a voice call, a video call, a conference or bridged call, or as text messaging in the form of a group chat.

Optionally, in addition to sending the instruction in block 526, the application may also send a data request as described elsewhere in this disclosure (block 530). The application ends process 500 thereafter.

Figure 6:
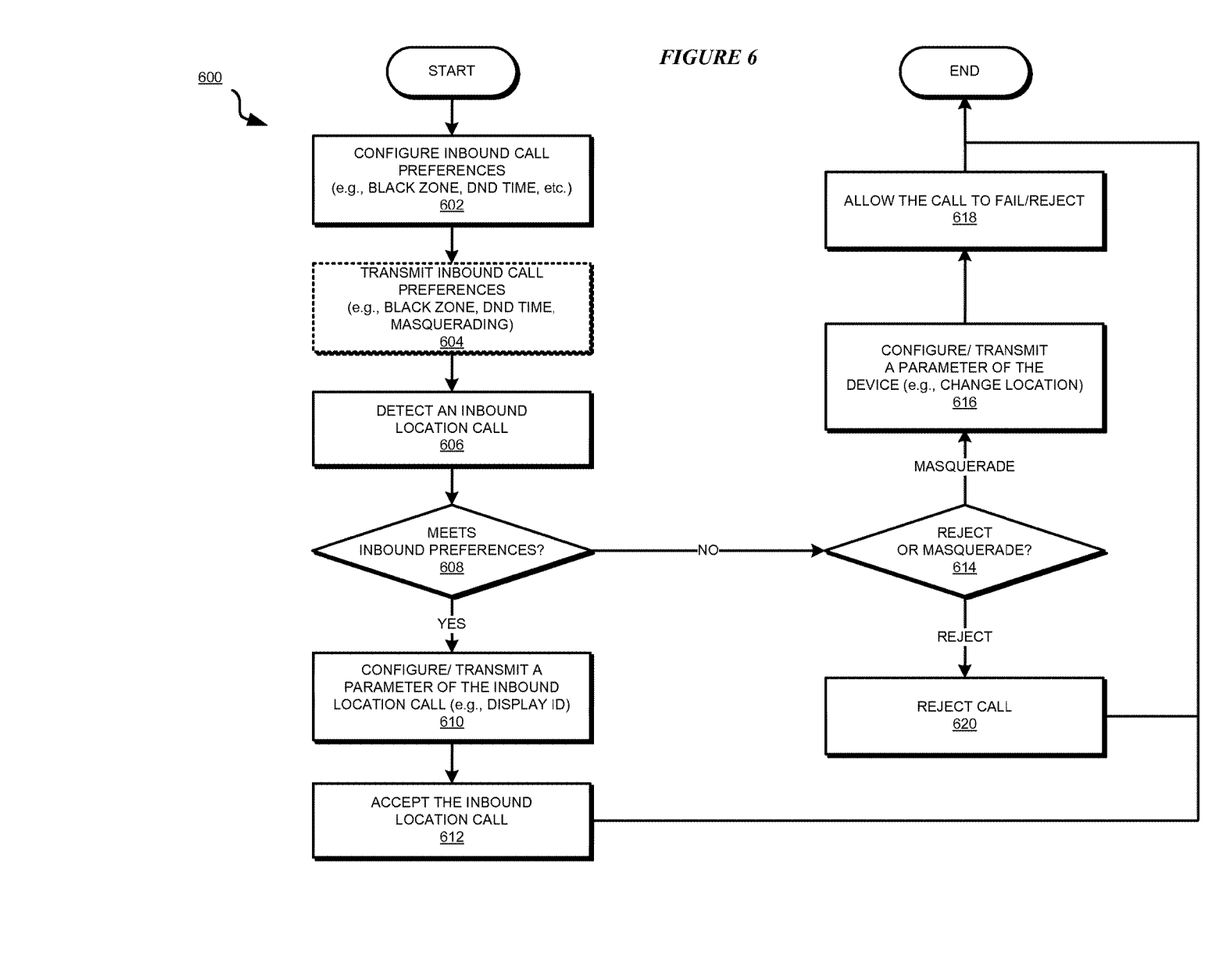
FIG. 6 depicts a flowchart of another example process for current location-based communication with mobile devices in accordance with an illustrative embodiment.

With reference to FIG. 6, this figure depicts a flowchart of another example process for current location-based communication with mobile devices in accordance with an illustrative embodiment. Process 600 can be implemented in application 402 in FIG. 4.

The application configures a preference for an inbound location call (block 602). The application optionally transmits one or more preferences to a server application, such as to server application 404 in FIG. 4 (block 604).

Many possible preferences can be configured in blocks 602 and 604. For example, one embodiment allows a potential callee to masquerade the location of the potential callee's device as being present everywhere, to wit, anywhere a caller might want to place a location call. The embodiment thus enables the potential callee to accept or reject a location call based on other preferences when the call is actually received.

As an example, masquerading the location such that the location of the callee meets any location criterion of the caller may be restricted to only some callers, such as a list of previous callers, known callers, or callers meeting certain criteria. Such masquerading allows the potential callee to pretend to be present wherever a caller expects some callee to be present. For example, a salesperson could masquerade the location of the salesperson's device to associate the salesperson's device with the locations of multiple sites of a company, such that the salesperson receives a location call regardless of which site a caller intends for a location call. These examples of preferences and configurations are not intended to be limiting. From this disclosure, those of ordinary skill in the art will be able to conceive many other preferences, configurations, and manners of masquerading, and the same are contemplated within the scope of the illustrative embodiments.

The application detects an inbound location call (block 606). The application determines whether the inbound location call meets a combination of the configured inbound preferences (block 608). If the inbound location call meets a combination of the configured inbound preferences ("Yes" path of block 608), the application configures a parameter to be used with the inbound location call (block 610). For example, the application configured the call such that the caller can receive information about the callee, such as the callee's identity, a number or identifier associated with the mobile device where the application is executing, a normalized form of the identity or the identifier, or other similarly purposed information. In some cases, the application may transmit the parameter configured in block 610 to a server application.

The application accepts the inbound location call (block 612). The application ends process 600 thereafter.

If the inbound location call does not meet a combination of the configured inbound preferences ("No" path of block 608), the application determines whether to reject the call or masquerade a device location to avoid the call (block 614).

If the application decides to masquerade a device feature, such as the location of the device ("Masquerade" path of block 614), the application configures and/or transmits a changed parameter of the mobile device (block 616). The application then allows the inbound location call to fail (block 618). The application ends process 600 thereafter.

If the application decides to reject the call ("Reject" path of block 614), the application rejects the inbound location call (block 620). The application ends process 600 thereafter.

Thus, a computer implemented method, system or apparatus, and computer program product are provided in the illustrative embodiments for current location-based communication with mobile devices. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for current location-based telecommunication with communication devices, the method comprising:
   sending, from a caller communication device, an instruction to initiate a telecommunication with a set of destination communication devices, wherein the instruction comprises identifying information for a reference device but does not include any identifying information for the set of destination communication devices; and
   receiving, at the caller communication device, telecommunication data from a destination communication device in the set of destination communication devices, wherein a server has established a communication channel between the caller communication device and the destination communication device based on a geolocation proximity of the destination communication devices relative to the reference device.

2. The method of claim 1, further comprising:
selecting the destination communication device because (i) the destination communication device is present within the geolocation proximity of the reference device at the time of the telecommunication, and (ii) the destination communication device has an individual characteristic that is also required for the telecommunication.

3. The method of claim 2, wherein the individual characteristic comprises a language in which a callee at the destination communication device can communicate.

4. The method of claim 2, wherein the individual characteristic comprises an apparatus available to a callee at the destination communication device at the time of the telecommunication.

5. The method of claim 2, wherein the individual characteristic comprises a state of a callee at the destination communication device at the time of the telecommunication.

6. The method of claim 2, further comprising:
causing a portion of the instruction to be transmitted to the destination communication device;
causing, at the destination communication device, an evaluation to determine whether a callee associated with the destination communication device has the individual characteristic.

7. The method of claim 1, further comprising:
determining whether the instruction specifies the geolocation; and
resolving, responsive to the instruction not specifying the geolocation, the identifying information of the reference device to the geolocation.

8. The method of claim 7, further comprising:
sending the instruction to the server, wherein the resolving occurs at the server responsive to the sending.

9. A method for current location-based telecommunication with communication devices, the method comprising:
receiving, at a server from a caller communication device, an instruction to initiate a telecommunication with a set of destination communication devices, wherein the instruction comprises identifying information for a reference device but does not include any identifying information for the set of destination communication devices; and
establishing, using the server, a communication channel between the caller communication device and a destination communication device in the set of destination communication devices based on a geolocation proximity of the destination communication device relative to the reference device; and
sending, from the server to the caller communication device, telecommunication data from the destination communication device.

10. A method for current location-based telecommunication with communication devices, the method comprising:
sending, from a caller communication device, an instruction to provide a set of identifiers associated with a set of destination communication devices, wherein the instruction comprises an identifying information for a reference device but does not include any identifying information for the set of destination communication devices;
receiving, at the caller communication device, the set of identifiers associated with the set of destination communication devices, wherein a server has determined the set of identifiers associates with the set of destination communication devices based on geolocation proximity of the set of destination communication devices relative to the reference device; and
enabling the caller communication device to send an instruction to initiate a telecommunication with a destination communication device in the set of destination communication devices based on a selection of an identifier, which corresponds to the destination communication device, from the set of identifiers.

11. A method for current location-based telecommunication with communication devices, the method comprising:
receiving, at a server, from a caller communication device, an instruction to provide a set of identifiers associated with a set of destination communication devices, wherein the instruction comprises an identifying information for a reference device but does not include any identifying information for the set of destination communication devices;
determining, at the server, the set of identifiers associates with the set of destination communication devices based on geolocation proximity of the set of destination communication devices relative to the reference device;
sending, from the server, to the caller communication device, the set of identifiers associated with the set of destination communication devices; and
enabling, from the server, the caller communication device to send an instruction to initiate a telecommunication with a destination communication device in the set of destination communication devices based on a selection of an identifier, which corresponds to the destination communication device, from the set of identifiers.

12. A computer usable program product comprising a computer readable storage medium including computer usable code for current location-based telecommunication with communication devices, which when executed by a processor causes operations comprising:
sending, from a caller communication device, an instruction to initiate a telecommunication with a set of destination communication devices, wherein the instruction comprises identifying information for a reference device but does not include any identifying information for the set of destination communication devices; and
receiving, at the caller communication device, telecommunication data from a destination communication device in the set of destination communication devices, wherein a server has established a communication channel between the caller communication device and the destination communication device based on a geolocation proximity of the destination communication devices relative to the reference device.

13. The computer usable program product of claim 12, further comprising:
selecting the destination communication device because (i) the destination communication device is present within the geolocation proximity of the reference device at the time of the telecommunication, and (ii) the destination communication device has an individual characteristic that is also required for the telecommunication.

14. The computer usable program product of claim 13, wherein the individual characteristic comprises a language in which a callee at the destination communication device can communicate.

15. The computer usable program product of claim 13, wherein the individual characteristic comprises an apparatus available to a callee at the destination communication device at the time of the telecommunication.

16. The computer usable program product of claim 13, wherein the individual characteristic comprises a state of a callee at the destination communication device at the time of the telecommunication.

17. The computer usable program product of claim 13, further comprising:
causing a portion of the instruction to be transmitted to the destination communication device;
causing, at the destination communication device, an evaluation to determine whether a callee associated with the destination communication device has the individual characteristic.

18. The computer usable program product of claim 12, further comprising:
determining whether the instruction specifies the geolocation; and
resolving, responsive to the instruction not specifying the geolocation, the identifying information of the reference device to the geolocation.

19. The computer usable program product of claim 12, wherein the computer usable code is stored in a computer readable storage device in a data processing system, and wherein the computer usable code is transferred over a network from a remote data processing system.

20. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

* * * * *